INVENTOR.
J. C. PEMBERTON
BY
Warren T. Jessup
ATTORNEY

April 19, 1966   J. C. PEMBERTON   3,246,667
PRESSURE SAMPLING VALVE

Filed Dec. 21, 1964   3 Sheets-Sheet 2

INVENTOR.
J. C. PEMBERTON
BY
Warren T. Jessup
ATTORNEY

April 19, 1966     J. C. PEMBERTON     3,246,667
PRESSURE SAMPLING VALVE

Filed Dec. 21, 1964     3 Sheets-Sheet 3

INVENTOR.
J. C. PEMBERTON
BY Warren T. Jessup
ATTORNEY

3,246,667
PRESSURE SAMPLING VALVE
J. C. Pemberton, Lemon Grove, Calif.
(631 30th St., San Diego 2, Calif.)
Filed Dec. 21, 1964, Ser. No. 422,068
3 Claims. (Cl. 137—312)

This is the continuation-in-part of application Serial No. 80,305, filed January 3, 1961, now abandoned.

The present invention is directed to an improved valve assembly, and it pertains more particularly to an improved sampling valve which is capable, for example, of providing for multi-pressure measurements on a time-shared basis.

This invention is not a valve in the sense of distribution of fluids from a source to a place of consumption. Actually, this invention relates to pressure measuring devices in general, and relates more specifically to a multi-coupling system whereby one highly accurate and expensive pressure sensing and recording device may be successively connected to a series of conduits leading from distant pressure sources, and placed in convenient array for rapid successive connection to the sensing device. No appreciable flow of fluid is caused to pass through a connection when made, but rather the entire body of fluid within the valve is successively connected to the various pressure sources and takes on the pressure of the line from the particular pressure source. By this means, there is no appreciable time delay, but rather, as soon as alignment is made the source pressure immediately impresses upon the sensing device the true pressure to be recorded. In many respects, therefore, although this invention relates to valves, the problems encountered and solved differ.

An object of the invention is to provide an improved valve assembly which may be constructed in a relatively simple and economical manner to be sold at a relatively low cost.

Another object is to provide such an improved valve assembly which is extremely small in size and light in weight, and which therefore may be used in a wide range of applications where space is at a premium and where weight is a problem.

Another object of the invention is to provide such an improved valve assembly which is extremely rugged in its construction and which is capable of withstanding relatively rough usage.

A more particular object of the invention is to provide an improved pressure sampling valve assembly which is capable of sampling a relatively large number of different pressures at a relatively high rate of speed, so as to permit a single transducer (or pressure gauge) to measure on a cyclic successive basis, each of the different pressures.

Another object is to provide such an improved valve assembly which is constructed so that all moving parts may be immersed in an oil bath for low friction trouble-free operation.

Yet another object is to provide such an improved pressure sampling valve assembly which includes a rotatably mounted rotor, and in which any tendency for cocking of the rotor due to different input pressures is obviated for all practical purposes.

A further object of the invention is to provide such an improved pressure sampling valve which is capable of enabling a single transducer to make multiple pressure measurements, and which is constructed so that the pressure lines entering the valve are normally sealed off by the valve to allow the pressures therein to stabilize.

Note that according to the principles of this invention, a flow of fluid is not required from the place to be measured, and therefore fine tubing from a remote source to the sampling valve will be sufficient to give accurate pressure measurement.

The prior art structures most similar to the construction of the present invention, although differing in operation and result, are classified in Class 251, Subclass 283. One such device consists of a fixed and a rotatable disc having ground and lapped flat surfaces sealing against each other, the surfaces containing cooperating parts movable into and out of registration with each other in response to rotation of a movable disc. To reduce or prevent leakage the rubbing surfaces of the disc must not only fit closely together, but must be pressed together with a force greater than the separating force of the pressure fluid in the ports. Excessive force is undesirable because it increases the frictional resistance to rotation.

It has long been recognized that in plate type valves, even though made of relatively heavy thick discs, are capable of sufficient distortion under high pressures to permit excessive leakage between the discs. Furthermore, it is a problem to mount two plates for relative rotation, but maintaining a high pressure sealing contact. Hence, the prior art has provided a rotating valve portion backed up by strong thrust bearing means, plus a floating intermediate disc with mating flat surfaces to seal against the rotating valve portion. Then, the gap is bridged between the floating member and the main body block of the valve in which the feed ports were located, by means of a tube extending from the intermediate disc into the block. The tube is there sealed by a conventional packing gland. Thus, the tube is free to telescope into the opening of the block and maintain the seal, even though the floating member may have occasion to move with respect to the valve block.

This prior structure is designed for hydraulic valves using few ports. Hence, few such fitted tubes are required for a fully operative valve. For the purpose of the present invention, in sampling pressure sources from many locations, literally dozens of pressure sources are to be measured in quick succession one after the other. Furthermore, in order to serve this function successfully, the entire construction must be miniaturized, and often must not be substantially greater in size than a conventional two-battery flashlight. Hence, the economic problem, if not the technical problem, of fitting tubes into each of the spaces becomes entirely prohibitive in cost.

Accordingly, it is an object of the present invention to produce a bridging and sealing bellows construction for fully and effectively sealing between a valve body and a floating intermediate carrier ring at a cost low enough to enable the use of the carrier ring concept in exceedingly miniaturized construction and within acceptable cost limits for multi-connection sampling devices.

Broadly, the concept employed in this invention is to use a flexible boot or bellows device to bridge this gap. However, in miniaturized inexpensive construction, providing a flexible bellows interconnection is far more easily conceived than carried forth into practical production. According to this invention, this complex problem has been solved by the provision of O-rings. Although O-rings per se are old and well known and are often used for sealing purposes, they do not solve all sealing problems without considerable ingenuity in their use.

The environment in which the sealing must be accomplished in this invention is one wherein exceedingly high pressures, 2000 pounds per square inch being a common example, must be sealed against lateral space gaps. That is, parting surfaces between two plate members. Ordinarily, such pressures will extrude an O-ring and cause it to flow out the gap which is to be sealed.

The features of the invention which are believed to be new are set forth in the claims. The invention itself, however, together with further objects and advantages may best be understood by reference to the accompanying drawings, in which:

Figure 1:
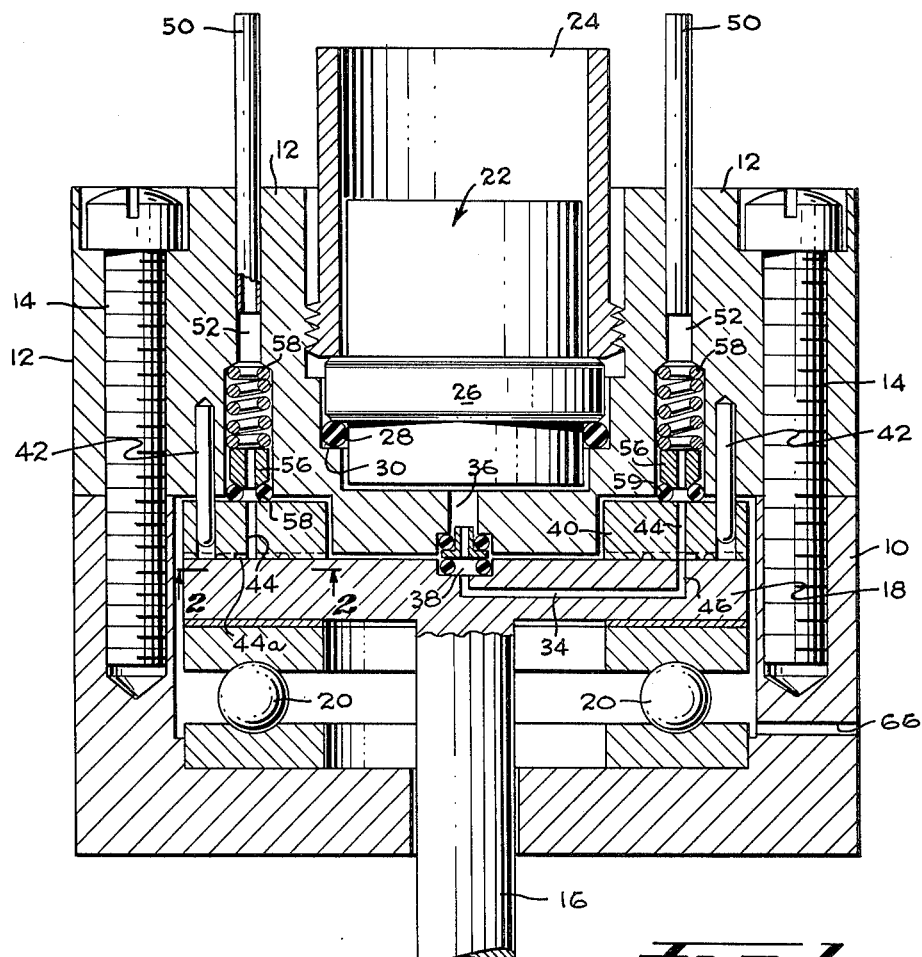
FIGURE 1 is an elevational view, partly in section, of an improved valve assembly constructed in accordance with the invention.

The embodiment of the invention shown in FIGURE 1 is in the form of an improved pressure sampling valve of a rotating rotor type. This type of valve makes it possible for a single transducer or pressure gauge to measure a plurality of unknown pressures, and to perform such a measurement rapidly on a successive and cyclic basis. The disclosed pressure sampling valve of FIGURE 1 is particularly useful, for example, for measuring aerodynamic or thermodynamic pressure fields, and of achieving this on a test stand or during an actual flight test.

The sampling valve of FIGURE 1 includes a base 10 which may have an essentially cylindrical configuration, and which may be supported by any appropriate means so as to constitute a stationary mount for the valve. A generally ring-shaped stationary stator block 12 is mounted on top of the base 10 in coaxial relationship with the base. The block 12 is so mounted on the base by a plurality of screws, for example, such as the screws 14.

A vertical drive shaft 16 extends through a central aperture in the bottom of the base 10, and this shaft is driven by an appropriate electric motor (not shown). A disc-shaped rotor 18 is mounted on the upper end of the shaft 16. The rotor is rigidly supported in the base 10 for rotation in the base but against axial movement therein by means of a thrust bearing 20.

A transducer or pressure gauge 22 may be centrally mounted in the ring-shaped block 12, for example, by means of a removable threaded tubular member 24. As illustrated, the transducer 22 may have a collar 26 formed integrally around its peripheral surface, and this collar engages a shoulder 30 in the bore of the block 12. An O-ring 28 may be interposed between the collar 26 and the shoulder 30 to form a fluidtight seal.

The lower face of the transducer 22 communicates with a radial passage 34 in the rotor 18 by way of a central vertical port 36 in the block 12 and an aligned vertical port 38 in the rotor 18. An appropriate fitting and associated O-rings may be disposed in the ports 36 and 38, as shown, to assure a fluidtight seal.

An annular-shaped stator member 40 is positioned in an annular channel formed by the under side of the block 12 and by the side of the base 10. The stator 40 rests on the top of the rotor 18, and rotation of the stator with respect to the block is prevented by means of a plurality of dowel pins, such as the pins 42. These pins extend axially into the stator 40 and into the block 12, and they permit the stator 40 to move axially towards and away from the block 12.

Figure 2:
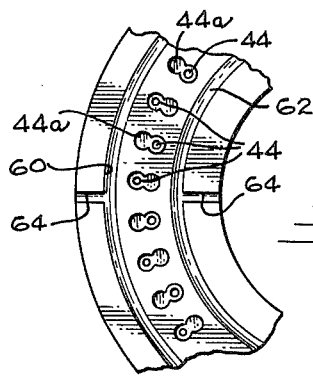
FIGURE 2 is a fragmentary view, taken substantially on the line 2—2 of FIGURE 1, and illustrating a portion of the lower surface of a stator element included in the valve assembly of FIGURE 1.

The stator 40 has a plurality of apertures 44 extending through it (see also FIGURE 2). As the rotor 18 turns, the passageway 34 is sequentially coupled to successive ones of the apertures 44 by way of a vertical collector port 46. As the rotor 18 rotates, the collector port passes into vertical alignment with successive ones of the apertures 44 in the stator 40.

The incoming pressure lines 50 are coupled to the valve assembly so as to extend into corresponding apertures 52 in the block 12. The pressure lines 50 and the apertures 52 are positioned around a circular path in the block. The apertures 52 in the block 12 are axially aligned with corresponding ones of the apertures 44 in the stator 40.

Each of the apertures 52 in the block 12 has an enlarged lower portion, and an apertured piston 56 is positioned in each of these enlarged portions. A plurality of springs 58 serve to bias respective ones of the pistons 56 downwardly against the upper face of the stator 40, and an O-ring 59 is placed between each of the pistons 56 and the face of the stator 40. The O-rings 59 assure an elastic fluidtight seal between the pistons 56 and the stator 40.

It is important to note that this structure provides a flexible bellows bridging the bore in the block 12 and the matching bore in the stator 40. In very high pressure work, considerations which may be minor in conventional pressure ranges become critical. The use of the O-ring 59 provides desirable high pressure functions. The stator 40 will deflect under pressure and temperature differentials which often causes nutation, and hence change of spacing between block and stator, particularly in a device of the type illustrated wherein a relatively rapid rotation of rotor 18 is employed to sample a high number of source tubes in rapid succession. Thus, the very nature of the resilient O-ring becomes of prime importance in that it is able to accommodate such gyrations within its own structure.

The collector port 46 on the rotor, as mentioned above, is sequentially vertically aligned with the apertures 44 in the stator 40 as the rotor 18 rotates. This causes the incoming pressure lines 50 to be sequentially coupled to the transducer 22. The transducer 22, therefore, is enabled sequentially and cyclically to measure the pressures in the different pressure lines.

In scientific measurements, as well as in operation of control apparatus, a pressure in a sampling tube must be converted to some form useful to man. Hence, a transducer of some type is required to sense the pressure and provide a neater reading for man to observe, electrical impulses which operate recording and observation apparatus, or directly converting the pressure variations and magnitudes into other types of control signals, such as electrical control signals, for use in other operations.

Scientifically, one of the obvious uses of this invention is in the measurement of pressures in and around air foils and other air flow areas. As an example of an industrial use of air pressure sampling, a petroleum refinery may be selected. Pressures in the system of a refinery are important. Also, anything which would cause a spark in a refinery area is not useful. Hence, many control operations are done by air pressure operated devices. Modern refineries are taking advantage of computers in order to detect need for alterations and to comply in the shortest period of time.

In each of these examples, it is apparent that an individual transducer may be secured to each pressure line. However, transducers which convert the pressure into electrical impulses, for example, are quite expensive. Although one transducer may not appear to have a prohibitively high price, if the number required is multiplied by hundreds, it will be apparent that cost factors become prohibitive. Furthermore, space becomes a considerable problem in many measuring and control systems, and therefore the use of hundreds of transducers would be impossible by reason of weight and space factors.

This invention provides for inexpensive measurement because only one transducer 22 is required to sense and record many source pressures. Further, the system is fast because the fluid within the passage 34 does not actually flow in the sense of transmission lines, but rather merely ebbs and tides according to the change of pressure between one sampling line 50 and another. Thus, the sampling response is quick because flow is not involved. These factors, coupled with the ability to hold the parts in accurate fluid sealing contact without overload binding, become exceedingly important in high pressure instrumentation.

The stator 40 is free to move axially back and forth with respect to the block 12 along the dowel pins 42, as noted above. The springs 58 cause the piston 56 to bear against the O-rings 59 on the upper face of the stator 40. This causes the lower face of the stator to be biased down into intimate contact with the upper face of the rotor 18. The lower end of each aperture 44 in the stator 40 is counterbored, as shown at 44a in FIGURE 2, so as to reduce the contacting surface area between the lower face of the stator 40 and the upper face of the rotor 18.

The pressure in each of the lines 50 creates a force between the stator 40 and the rotor 18. Because the rotor 18 is rigidly supported against axial movement in the base 10 by the thrust bearing 20, this force tends to move the stator 40 upwardly against the bias pressure of the springs 58. Such movement would tend to separate the stator 40 from the rotor 18 and would break the fluid connection between the pressure lines 50 and the transducer 22. This upward force is countered by the downward pressure of fluid in the aperture 52 acting on the stator 40 through the O-ring 59.

Under high pressures, fluid seeps radially outward from the port 44 between the abutting faces of the stator 40 and rotor 18. If this fluid is allowed to spread over the entire interface between stator and rotor, a serious separation between the parts tends to occur. This constitutes valve failure with consequent danger of serious leakage of incoming fluid and cross connection among adjacent inlet parts. To obviate such separation annular relief channels 60 and 62 (FIGURE 2) are provided in the underside of the stator 40 and on radially opposite sides of the ports 44. Radial channels 64 are also provided. Thus separation pressure is limited to the annular interface area between the channels 60 and 62, which thus limits the separation force which the seepage pressure can cause.

An important discovery of this invention is found in the balancing of forces acting on the stator and rotor. Separation is prevented by use of channels 60 and 62. This invention provides also for the use of the pressure in the several inlet tubes to produce a force pressing the stator face into fluid sealing contact with the upper face of the rotor.

This effect is accomplished by sealing off a surface area around each passageway port 44, and exposing that area to the pressure of the line. Thus a piston area is provided around each port, and a counterbalance force is created by the size and placement of channels 60 and 62. The difference in forces, multiplied by the number of ports, will determine the net force acting to press the stator against the rotor.

If this net is too large, the rotor will be locked by excessive friction. If it is too little, there may be leakage between ports. Hence, because this invention provides positive bellows sealing, and also variable balancing of forces, the frictional sealing forces may be selected to a fine degree of accuracy by a balance of the area within the O-ring bellows in ratio to the area within the channels 60 and 62.

According to the statement in the object, a passageway 66 is provided as a breather opening, and thus the interior cavity may be filled with oil and thereby all moving parts may be immersed in an oil bath for low friction, trouble-free operation. It is normal that the devices according to this invention operate with the shaft 16 extending horizontally and therefore, no closure is needed for the breather opening 66. If it is desired to operate the device vertically, the breather must be extended above the normal oil level.

The fragmentary views of FIGURES 3, 4, 5, 6, 7 and 8 show modifications of the flexible coupling of the pressure lines 50 to the collector port 46 in the rotor 18. In these views, components similar to those shown in the view of FIGURE 1 have been designated by the same numerals.

Figure 3:
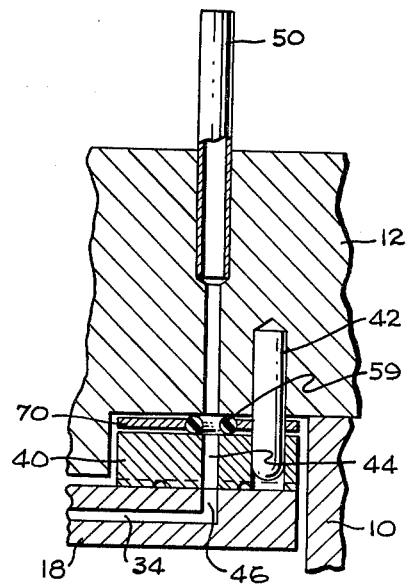
FIGURES 3–8 are fragmentary sectional veiws, showing different coupling configurations between an inlet line of the valve combination, and a stator assembly in the combination.

In the embodiment of FIGURE 3, springs 58 are not required, their function being supplied by the resiliency of O-rings 59 compressed slightly between stator 40 and block 12, although they may be used if desired for certain circumstances. The apertured pistons 56 have also been dispensed with. In the embodiment of FIGURE 3, an annular apertured plate 70 is interposed between the block 12 and the stator 40. This annular plate supports the O-rings 59 in its apertures, and it serves to prevent the O-rings from expanding and bursting at elevated pressures.

Hence, this is an illustration of the prevailing structure throughout the disclosure of the present invention, in that the flexible bellows O-ring means is made practical by use of a rigid radial retaining surface means providing holding and containing means over the bulk of the surface of the O-ring, and allowing the O-ring to simply serve as a flexible bellows over a minute gap area of minimal size.

Figure 4:
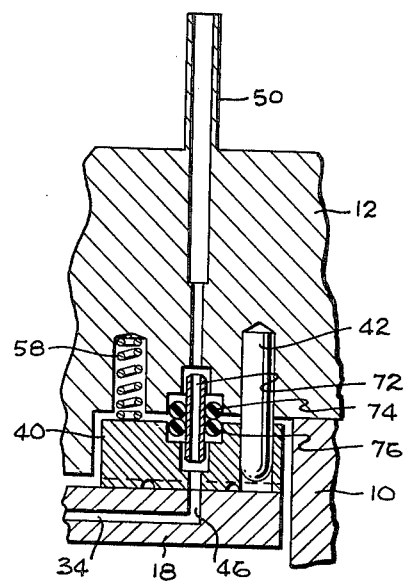
Figure 5:
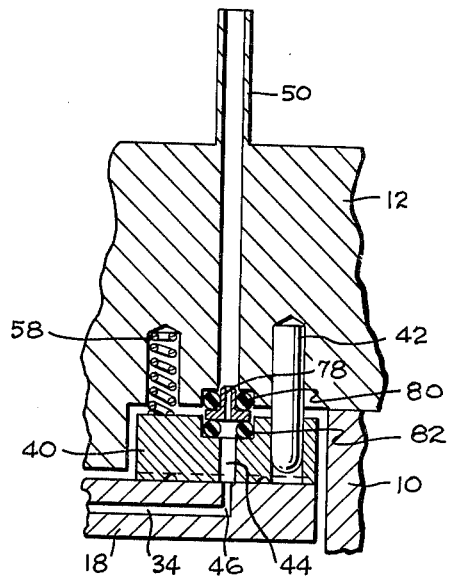
Figure 6:
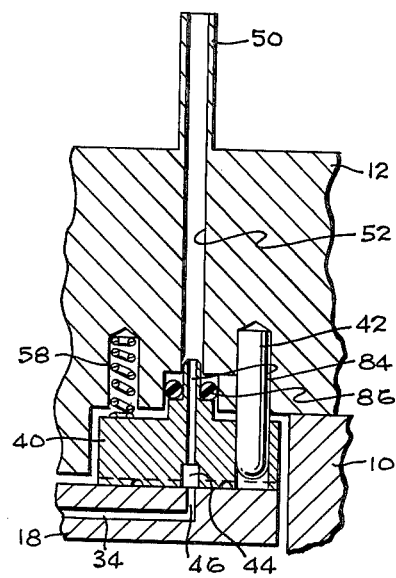

As in FIGURE 3, the pistons 56 have been eliminated in the forms shown in FIGURES 4, 5 and 6; but the springs 58 have been retained, in separate individual bores in the block 12.

The embodiment of FIGURE 5 is generally similar to that of FIGURE 3, except that the O-ring 59 has been replaced by a more elaborate fitting which includes a short length of pipeline 72 and a pair of O-rings 74 and 76.

The embodiment of FIGURE 4 is generally similar to that of FIGURE 4, except that the fitting is modified to includes a T-shaped pipeline member 78 which bears against a pair of O-rings 80 and 82.

In the embodiments of FIGURES 4, 5 and 6, the inlet pressure lines 50 are shown as formed integrally with the block 12. In the embodiment of FIGURE 6, a tubular member 84 extends upwardly from the port 44 in the stator 40 into the corresponding aligned aperture 52 in the block 12. An O-ring 86 is positioned around the tubular member 84 to assure a fluidtight joint.

Figure 7:
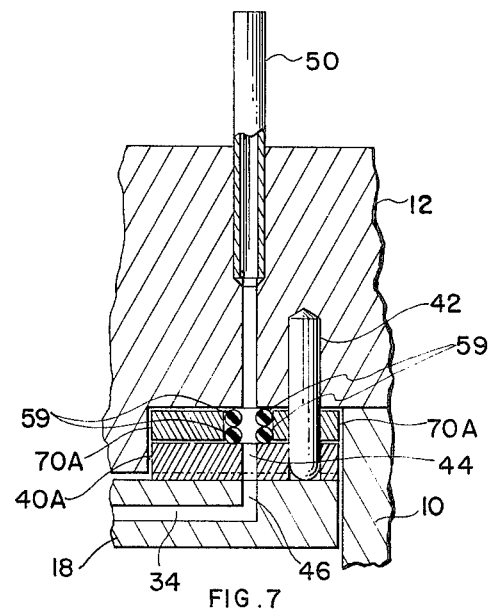
Figure 8:
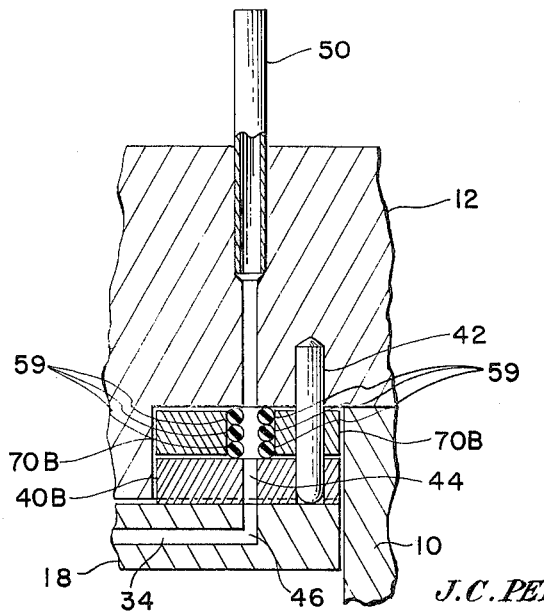

FIGURES 7 and 8 emphasize the bellows effect which is possible by means of this invention. In FIGURE 7, the apertured plate is referred to by reference character 70a, and it will be seen that this plate is substantially wider than the plate 70 in FIGURE 3. However, the principle of bridging between the members is inherent in the positioning of the two O-rings, and the O-rings are reinforced against radial expansion except over the minimal gap area which is maintained in order that the vertical freedom of movement may be provided.

FIGURE 8 illustrates the bellows concept carried on to a three-tier level in order that the bellows may be considerably extended and the resiliency obtained in three units in order that no one of the three may be stressed and worked beyond its good sealing limit, and therefore may be made of a stiff nature to give a vertical spring action without undue distortion. The three O-rings are backed by a still larger apertured ring 70b. Note that the recess has been made larger in this embodiment and the stator 40b maintained at a larger thickness than possible in a fixed space area with an increased thickness of retainer rings. This is a construction convenience.

A constructed embodiment of the invention operates on pressures up to 1000 pounds per square inch. This constructed embodiment of the invention includes forty-eight pressure lines. Moreover, it exhibits sampling rates up to 50 ports per second during normal operation.

The invention provides, therefore, an improved valve assembly which is eminently simple, compact and rugged in its construction; which is light in weight; and which operates with a high degree of speed and efficiency in the performance of its intended function.

What is claimed is:

1. A valve assembly including: a rotatable rotor member having a disc-shaped surface, a stationary block member having an annular surface disposed in spaced facing relationship with said disc-shaped surface of said rotor member and having a plurality of apertures extending therethrough and further having a central aperture therein, an annular stator member disposed in the space between said stationary block member and said disc-shaped surface of said rotor member and having a plurality of apertures extending therethrough in respective axial alignment with the apertures of said plurality in said stationary block member, a plurality of dowel pins extending axially into said stationary block member and into said stator to prevent relative rotational movement between said stator member and said block member but to permit axial movement therebetween, said rotor member having a first port formed therein in a position to be brought into successive axial alignment with said apertures in said annular stator member as said rotor member is rotated with respect to said block member, and said rotor member having a second central port therein in axial alignment with said central aperture in said stationary block member and having a radial passage therein extending between and communicating with said first port and said second central port, a plurality of springs respectively disposed in respective ones of the apertures of said plurality in said stationary block member, and a plurality of apertured pistons respectively disposed in corresponding ones of said apertures in said block member in engagement with respective ones of said spring members to be biased thereby against the adjacent surface of said stator, and a corresponding plurality of O-rings respectively interposed between respective ones of said pistons and the adjacent surface of said stator, in which the end adjacent said rotor member of each of said apertures extending through said stator member is counterbored to reduce the surface area of said stator member in contact with the surface of said rotor member, and in which the surface of said stator member adjacent said rotor member has at least one annular groove formed therein adjacent the end of said apertures and extending around said stator and at least one further groove communicating with said annular groove to provide a pressure relief means on said stator for fluid seeping between the adjacent surfaces of said stator and said rotor.

2. A valve assembly including: a rotatable rotor member having a disc-shaped upper surface, a stationary block member having an annular surface disposed in spaced facing relationship with said disc-shaped upper surface of said rotor member and having a plurality of apertures extending therethrough for receiving a corresponding plurality of pressure inlet lines and having a central aperture therein to constitute a central port for the valve assembly, an annular stator member disposed in the space between said stationary block member and said disc-shaped upper surface of said rotor member and having a plurality of apertures extending therethrough in respective axial alignment with the apertures of said plurality is said stationary block member, said stator member having a closely fitted surface with said rotor member and having a bleed-off channel system surrounding each said aperture opening therein, said bleed-off system establishing a maximum surface exposed to the pressure within said aperture, a plurality of O-rings disposed between said stationary block member and said annular stator member between respective ones of the ends of said apertures in said block member and the ends of respective ones of said apertures in said stator member, said O-rings having an effective sealing area against the surface of the stator member around the aperture, said effective sealing area being related to the said maximum surface around the opposite end of said aperture in a ratio to balance effective pressure forces and provide a fluid sealing force between said rotor and stator member, means coupling said annular stator member to said block member to prevent relative rotational movement between said stator member and said block member but to permit axial movement therebetween, said rotor member having a first port formed in the upper surface thereof in a position to be brought into successive axial alignment with said apertures in said stator member as said rotor member is rotated with respect to said stationary block member, and said rotor member having a second central port therein in axial alignment with said central aperture in said stationary block member and having a passage therein extending between and communicating with said first port and second central port, said block member being configured to receive and mount a pressure transducer in said central aperture therein in operating communication with said central port of said rotor.

3. A valve assembly including:

a rotatable rotor member having a disc-shaped upper surface, a stationary block member having an annular surface disposed in spaced facing relationship with said disc-shaped upper surface of said rotor member and having a plurality of apertures extending therethrough for receiving a corresponding plurality of pressure inlet lines and having a central aperture therein to constitute a central port for the valve assembly, an annular stator member disposed in the space between said stationary block member and said disc-shaped upper surface of said rotor member and having a plurality of apertures extending therethrough in respective axial alignment with the apertures of said plurality in said stationary block member;

said stator member having a closely fitted surface with said rotor member and having a bleed-off channel system surrounding each said aperture opening therein, said bleed-off system establishing a maximum surface exposed to the pressure within said aperture, a plurality of O-rings disposed between said stationary block member and said annular stator member between respective ones of the ends of said apertures in said block member and the ends of respective ones of said apertures in said stator member;

said O-rings having an effective sealing area against the surface of the stator member around the aperture, said effective sealing area being related to the said maximum surface around the opposite end of said aperture in a ratio to balance effective pressure forces and provide a fluid sealing force between said rotor and stator member, means coupling said annular stator member to said block member to prevent relative rotational movement between said stator member and said block member, but to permit axial movement therebetween, said rotor member having a first port formed in the upper surface thereof in a position to be brought into successive axial alignment with said apertures in said stator member as said rotor member is rotated with respect to said stationary block member, and said rotor member having a second central port therein in axial alignment with said central aperture in said stationary block member and having a passage therein extending between and communicating with said first port and said second central port.

References Cited by the Examiner

UNITED STATES PATENTS

| | | | |
|---|---|---|---|
| 2,736,339 | 2/1956 | Asbury et al. | 251—174 X |
| 2,742,050 | 4/1956 | Gray et al. | 137—312 |
| 2,744,540 | 5/1956 | Erle | 251—283 X |
| 2,974,681 | 3/1961 | Whitehurst | 137—624.13 |
| 3,008,490 | 11/1961 | Angelos | 137—625.11 |

M. CARY NELSON, *Primary Examiner.*